UNITED STATES PATENT OFFICE.

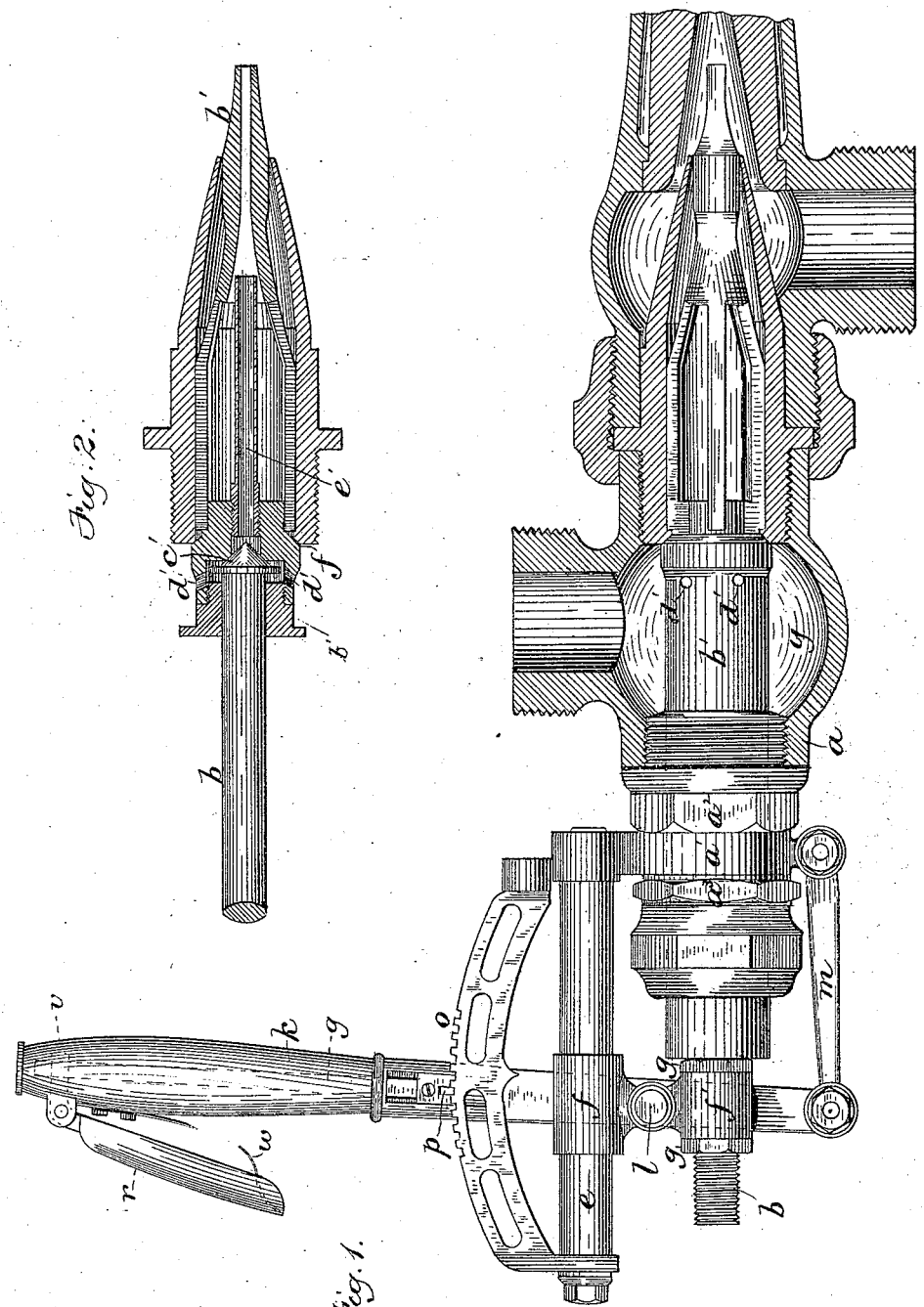

WILLIAM B. MACK, OF BOSTON, MASSACHUSETTS.

INJECTOR.

SPECIFICATION forming part of Letters Patent No. 334,124, dated January 12, 1886.

Application filed October 31, 1884. Serial No. 146,916. (Model.)

*To all whom it may concern:*

Be it known that I, WILLIAM B. MACK, of Boston, in the county of Suffolk and State of Massachusetts, have invented certain Improvements in Injectors, of which the following is a specification.

This invention has for its object to provide improved means for operating the steam-plug of an injector; and it consists in the improvements hereinafter described and claimed.

Of the accompanying drawings, forming a part of this specification, Figure 1 represents a side elevation of a portion of the steam-plug and its operating devices, the casing of the injector being shown in section. Fig. 2 represents a sectional view of a modification.

In the drawings, $a$ represents the casing of the injector, and $b$ the steam-plug thereof, the injector being constructed, excepting as to the particulars hereinafter specified, substantially as shown in Letters Patent of the United States heretofore granted to me, and particularly the patent granted April 2, 1882. To the casing $a$ is affixed a rod, $e$, which extends parallel with the steam-plug. A sleeve, $f$, adapted to slide on the rod $e$, has a socket, $f'$, attached to it, through which socket the threaded outer end of the steam-plug passes, jam-nuts $g\ g$ on said threaded end bearing against the ends of the socket $f'$ and securing it adjustably to the plug $b$.

$k$ represents a lever connected at one end by a link, $m$, with the casing $a$, and pivoted at $i$ to the neck which connects the slide $f$ with the socket $f'$.

$o$ represents a notched segment-bar attached to the casing $a$ and the rod $e$. The lever $k$ has a dog, $p$, adapted to engage with the notches on the bar $o$, said bar being attached to a rod, $g$, which extends through the handle of the lever, and engages with a lug, $v$, formed on a handle, $r$, which is pivoted to the lever $k$, said lug projecting through a slot in the side of the lever. When the handle $k$ is pushed toward the lever, the lug $v$ is moved outwardly, and moves the rod $g$ so as to withdraw the dog $p$ from contact with the notched segment-bar. When the handle $r$ is released, a spring, $w$, interposed between it and the lever forces the handle outwardly, and causes the lug $v$ to move the rod $g$ in the opposite direction, and thus press the dog against the segment-bar.

It will be seen that the handle $r$ is pressed inwardly and caused to withdraw the dog from the segment-bar by the operator's hand when the lever is grasped, and pressed outwardly by the spring $w$ and caused to press the dog against the segment-bar when the lever is released. When the dog is withdrawn from the segment-bar, a movement of the lever will move the steam-plug inwardly or outwardly, as the case may be, the sleeve $f$ sliding with the plug on the rod $e$, the dog $p$ and segment-bar $o$ locking the plug at any point to which it may be moved.

The portion of the plug that is contained in the space $y$, into which the steam first enters, may be made of uniform diameter, so that the pressure of the steam on the plug is equalized and back-pressure is avoided.

The rod $e$ and segment-bar $o$ are attached to a collar, $a'$, which is clamped between a shoulder, $a^2$, and a jam-nut, $a^3$, on the casing of the injector. The link $m$ is pivoted to ears on the collar $a'$. The rod $e$, segment-bar $o$, and lever $k$ can therefore be applied and removed without being separated from each other simply by removing the collar $a'$. The steam-plug is provided with a cone, $b'$, having apertures $d'\ d'$ above its valve portion.

In Fig. 2 the steam-plug $b$ is shown in the same manner as in my former patents, having the cone $b'$ provided with the auxiliary starting-valve $c'$. It will be seen that I have attached a tube, $e'$, to the inside of the main-valve seat and extending into the passage through the cone $b'$. When steam is allowed to enter said tube through the holes $d'\ d'$, when the steam-plug is drawn back, the steam enters the tube and passes into and fills the passage through the cone $b'$, thereby causing a suction and lifting the water, and at the same time backs up and fills the space around the outside of said tube $e'$, and in so doing relieves the main valve $f$ of the pressure of steam on the opposite side, thus enabling the valve to be drawn back from its seat with ease.

I am aware that it is not new to provide an injector with an operating-lever connected to the casing of the injector by a pivoted link and to the steam-plug by a sleeve, to which the lever is pivoted, said sleeve sliding on a fixed rod. I do not, therefore, claim this combination of parts.

I am aware that an injector has been patented in which the plug is shown as adapted to be moved by a lever pivoted to a link on the casing and to a slide attached to the plug-stem. Such I do not broadly claim; but What I do claim, and desire to secure by Letters Patent, is—

1. In combination with the injector-casing $a$, the collar $a'$, clamped to the same, and having rigid rod $e$ secured at one side and link $m$ pivoted at the other side of casing $a$, the notched sector $o$, attached to rod $e$, the slide $f$ on rod $e$, the sleeve $f'$, attached to the slide and adjustably secured to the outer end of the steam-plug, and the operating-lever pivoted to link $m$ and slide $f$, and having a fastening-catch engaging the notches on the sector-bar, as set forth.

2. In an injector, the combination of the casing $a$, the steam-plug $b$, the collar $a'$, detachably secured to the casing, the rod $e$, and segment-bar $o$, secured to the collar $a'$, the slide $f$ and sleeve $f'$, located, respectively, on the rod $e$ and plug $b$, and the lever $k$, pivotally connected to the said slide and sleeve and the collar $a'$, and provided with the dog $p$ and its operating devices, as set forth.

3. The steam-plug $b'$, having holes $d'$ $d'$ therein, and separate tube $e'$, extending into the passage through the cone, in combination with starting-valve $c'$ inside the plug $b'$ and forward of holes $d'$, and seated to close the rear end of tube $e'$, as set forth.

In testimony whereof I have signed my name to this specification, in the presence of two subscribing witnesses, this 7th day of October, 1884.

WILLIAM B. MACK.

Witnesses:
C. F. BROWN,
H. BROWN.